United States Patent
Seiler

(10) Patent No.: US 12,289,159 B2
(45) Date of Patent: Apr. 29, 2025

(54) METHOD AND SYSTEM FOR DELAYED CYCLIC FORWARDING OF MESSAGES

(71) Applicant: dSPACE GmbH, Paderborn (DE)

(72) Inventor: Remigiusz Seiler, Paderborn (DE)

(73) Assignee: DSPACE GMBH, Paderborn (DE)

( * ) Notice: Subject to any disclaimer, the term of this patent is extended or adjusted under 35 U.S.C. 154(b) by 498 days.

(21) Appl. No.: 17/847,311

(22) Filed: Jun. 23, 2022

(65) Prior Publication Data

US 2023/0024981 A1    Jan. 26, 2023

(30) Foreign Application Priority Data

Jul. 22, 2021 (DE) .......................... 102021119053.3

(51) Int. Cl.
*H04J 3/06* (2006.01)
*H04L 47/28* (2022.01)

(52) U.S. Cl.
CPC ............ *H04J 3/0661* (2013.01); *H04L 47/28* (2013.01)

(58) Field of Classification Search
CPC ............................... H04J 3/0661; H04L 47/28
See application file for complete search history.

(56) References Cited

U.S. PATENT DOCUMENTS

| | | | | |
|---|---|---|---|---|
| 6,038,230 A * | 3/2000 | Ofek | ....................... | H04L 49/90 370/389 |
| 2012/0008641 A1 * | 1/2012 | Stoica | .................. | H04L 47/225 370/465 |
| 2012/0224610 A1 * | 9/2012 | Baldemair | ......... | H04B 7/15585 375/211 |
| 2017/0169623 A1 * | 6/2017 | Chen | ........................ | G07C 5/02 |
| 2018/0048575 A1 * | 2/2018 | Mangin | ................... | H04L 47/20 |
| 2022/0340149 A1 * | 10/2022 | Nister | ................. | B60W 60/001 |

FOREIGN PATENT DOCUMENTS

| CN | 112188519 A | * | 1/2021 | ............ H04W 24/02 |
|---|---|---|---|---|
| DE | 102016007966 A1 | * | 1/2018 | ....... G01R 31/31922 |

OTHER PUBLICATIONS

English translation for CN_112188519_A_Ying (Year: 2021).*
English translation for DE_102016007966_A1_Klemm (Year: 2018).*

* cited by examiner

*Primary Examiner* — Chi H Pham
*Assistant Examiner* — Weibin Huang
(74) *Attorney, Agent, or Firm* — LEYDIG, VOIT & MAYER, LTD.

(57) ABSTRACT

A method for delayed cyclic forwarding of messages by a system includes: receiving, by an input side of the system, the messages to be forwarded; and sending, by an output side of the system, the messages to be forwarded to a receiving device. A check is performed to determine whether the difference between a current system time and a receive time of a message under consideration is greater than or equal to the delay time. In the event that the difference is greater than or equal to the delay time, the message that has been in the buffer memory for the next longest time being checked in the same manner, and the checking of the messages is continued until a difference smaller than the specified delay time is found for a message.

10 Claims, 2 Drawing Sheets

METHOD AND SYSTEM FOR DELAYED CYCLIC FORWARDING OF MESSAGES

CROSS-REFERENCE TO PRIOR APPLICATIONS

This application claims benefit to German Patent Application No. DE 102021119053.3, filed on Jul. 22, 2021, which is hereby incorporated by reference herein.

FIELD

The invention relates to a method for delayed forwarding of messages by a system, the system having an input side with terminals for receiving the messages to be forwarded, the system having an output side with terminals for sending the messages to be forwarded to a receiving device, the system having a system time, the messages to be forwarded having a receive time stamp, the messages to be forwarded that are received at the input side being stored in a buffer memory, a delay time being specified for the sending of the messages to be forwarded. The invention also relates to the system for carrying out the method.

BACKGROUND

Such a method is used, for example, in the testing of control units, where a control unit to be tested, as the receiving device, receives messages from or via a system, e.g., a hardware-in-the-loop (HIL) simulator. In one application, an HIL system is interconnected between the control unit to be tested and a first sending device (e.g., another control unit or a device that sends recorded messages), and the HIL system forwards the messages it receives from the first sending device to the control unit to be tested. During such forwarding by the HIL system, the messages of the first sending device can be selectively delayed or manipulated on the HIL system. Manipulation for test purposes is obviously useful. Delayed forwarding can be used, for example, to synchronize the messages at the receiving device to be tested with other messages that the receiving device receives from other devices sending to the receiving device, e.g., from other control units or from a control unit network.

HIL systems of this type are marketed by the company dSPACE GmbH, for example. In these systems, the forwarding of messages is performed in an event-driven manner. This means that the event of the arrival of a message at the input side of the HIL system causes the message to be sent at the output side.

When the message arrives at the HIL system, it is usually provided with a receive time stamp according to the system time of the HIL system. "System time" refers here to the time which is defined in the HIL system or which is used for calculation by the simulator usually provided in an HIL system; i.e., the simulation time that begins with the start of the simulation for testing the control unit.

A delay time can be specified (e.g., via a user interface or in a configuration file) for the sending of the message at the output side, and it is also made possible to manipulate the content of the message or the message itself. The delay time determines how long the message is to be buffered in the HIL system (e.g. in a buffer memory) before it can be forwarded to the receiving device. However, such event-based forwarding does not allow for cyclic sending of messages to the receiving device, unless cyclic messages are received by the HIL system.

SUMMARY

In an exemplary embodiment, the present invention provides a method for delayed cyclic forwarding of messages by a system. The method includes: receiving, by an input side of the system, the messages to be forwarded; and sending, by an output side of the system, the messages to be forwarded to a receiving device. The system has a system time. The messages to be forwarded have receive time stamps. The messages to be forwarded that are received at the input side are stored in a buffer memory. A delay time is specified for the sending of the messages to be forwarded. A cycle time is specified for the sending of the messages to be forwarded. Messages are sent by the system at intervals of the specified cycle time from the buffer memory via the output side of the system to the receiving device. For purposes of cyclic forwarding of the messages, the receive time stamp of the message that has been in the buffer memory for the longest time is checked first. A check is performed to determine whether the difference between the current system time and the receive time of a message under consideration is greater than or equal to the delay time. In the event that the difference is greater than or equal to the delay time, the message that has been in the buffer memory for the next longest time being checked in the same manner, and the checking of the messages is continued until a difference smaller than the specified delay time is found for a message. In the event that the difference is smaller than the specified delay time, the last checked message for which the difference was greater than or equal to the specified delay time is designated for forwarding, and all previously checked messages are discarded.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
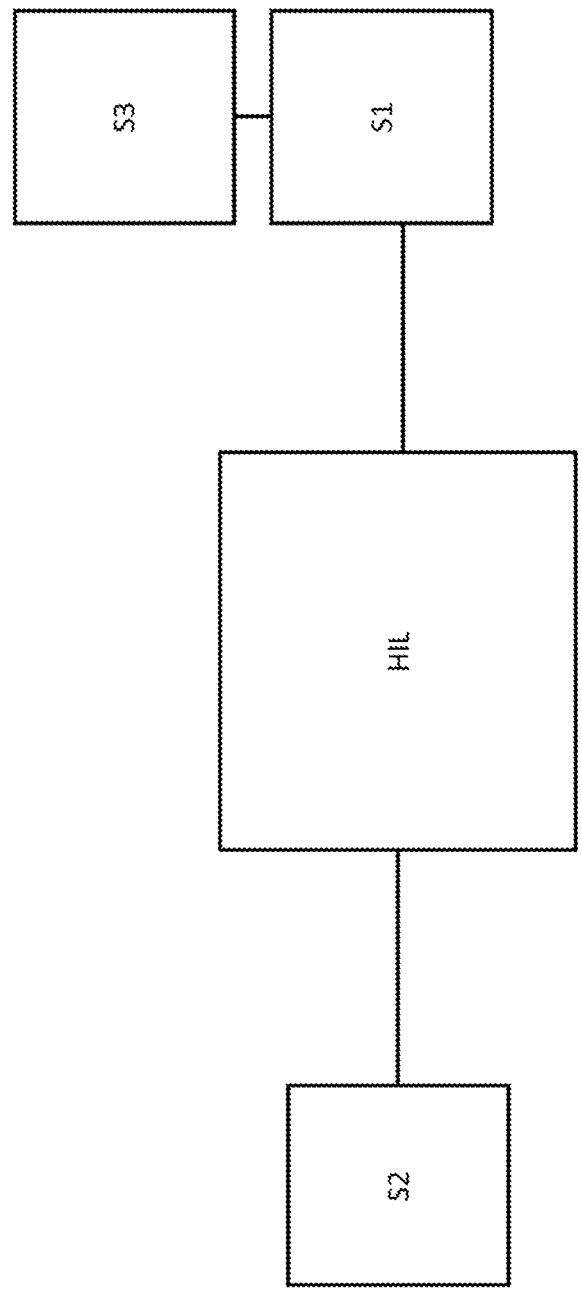
FIG. 1 is a schematic illustration of the system according to the invention.

Exemplary embodiments of the present invention provide a method for delayed cyclic forwarding, where a cycle time is specified by the user (e.g., via a user interface or a configuration file) for the sending of the messages to be forwarded, where messages are sent by the system at intervals of the specified cycle time from the buffer memory via the output side of the system to the receiving device, and where for purposes of cyclic forwarding of the messages, the receive time stamp of the message that has been in the buffer memory for the longest time is checked first, where a check is performed to determine whether the difference between the current system time and the receive time (indicated by the receive time stamp) of the message under consideration is greater than or equal to the delay time, where in the event that this difference is greater than or equal to the delay time, the message that has been in the buffer memory for the next longest time is checked in the same manner and the checking of the messages is continued until a difference smaller than the specified delay time is found for a message, where in the event that the difference is smaller than the specified delay time, the last checked message for which the difference was greater than or equal to the specified delay time is designated for forwarding, and all previously checked messages (i.e., all messages with a longer residence time in the buffer) are discarded.

The invention also enables testing of receiving devices that require regular receipt of messages, even if such messages are not cyclically provided by the test environment. In addition, the invention also makes it possible to take into account a delay time so that messages are not sent too early to the control unit to be tested. This is important, for example, if the control unit to be tested requires input data from two different devices and the receipt of messages must occur in a synchronized manner.

In one embodiment, in the event that in a cycle, the difference between the current system time and the receive time of the message is smaller than the specified delay time already for the first message checked, a default message is sent or the message sent in the last cycle is sent again. An example of a default message that may be sent is a message in which all of the corresponding signals are set to 1.

Preferably, the system is provided by a hardware-in-the-loop simulator and the receiving device by a control unit. The HIL simulator simulates the "environment" to the control unit to be tested; i.e., it provides the control unit to be tested in real time with the necessary signals and messages that the control unit to be tested does not receive via other connected devices. For this purpose, the necessary signals or messages are calculated/simulated on the HIL simulator and/or forwarded by the HIL simulator during the simulation in accordance with a predetermined configuration of the communication.

Preferably, the system receives the messages to be forwarded from a first sending device. This first sending device is, for example, another control unit or a device for playing back recorded messages.

In an embodiment, the forwarding of messages is switched from cyclic forwarding to event-based forwarding and vice versa, if so specified by the user via a suitable user interface. (Switchable in the system)

When forwarding is switched from interval-based to event-based mode, all pending messages are sent immediately, taking into account the delay time, without taking into account the cycle time, and without any messages being discarded.

When switching from event-based to cyclic forwarding, the cycle begins at the time of the switchover. Then, the first message after the switchover is sent only after the cycle time has elapsed.

In another embodiment, the cycle time is changed during runtime, if so specified by the user.

Changing the cycle time during cyclic forwarding has an immediate effect on the respective next message to be sent. In this connection, the time elapsed since the last dispatch also counts. If the length of the new cycle time has been reduced to such an extent that the last checked message must be sent immediately, then this message is sent immediately, a new cycle begins at this point in time, and the procedure of the invention for checking the messages present in the buffer memory begins at this point in time. If the new cycle time is so short that two checked messages would already fit within the elapsed time, then, nevertheless, only one message (the current one) is sent.

The memory addresses in the buffer memory in the HIL system are written to according to a predetermined temporal order so that the system knows which message is the oldest, i.e., which one has been in the buffer memory for the longest time. Preferably, a pointer points to the oldest message so that this message is known at all times.

A buffer memory is provided, for example, by a chain or ring structure of individual buffer memory units for the individual messages. Due to the chain or ring structure, the chronological order of the stored messages can be determined starting with the message that is marked as the oldest message by a pointer. Preferably, a pointer to the most recent entry is also provided in order to easily determine empty buffer units for the next incoming message. Such pointers can also be used for linear memory structures.

In an embodiment, a plurality of buffer memories are provided, namely, one buffer memory (preferably including a plurality of buffer memory units) for each message type (also known as protocol data unit (PDU)).

In an embodiment, the receive time stamp is assigned to the messages upon receipt at the input side and is given by the system time at the time of receipt, the system time here preferably being given by the simulation time.

Preferably, this time stamp is assigned even if the messages sent by the first sending device already have a time stamp. The time on the wire between the first sending device and the system can be calculated from the difference between this existing time stamp and the receive time stamp. Preferably, the system time is given here by the simulation time.

In an embodiment, the delay time is set in a message-specific manner. This means, for example, that user can specify different delay times for messages with different IDs. For example, for different IDs, the user can specify different offset values for the delay time in a configuration file or a user interface. For messages with a specific ID, a specific offset value is then always added to the delay time. Such a procedure can also be used for messages with specific contents, or the like.

The invention will now be described in more detail with reference to the drawings. The figures shown are illustrative and should not be considered as exhaustive.

FIG. 1 schematically shows the system HIL according to the invention, the system HIL being provided by an HIL simulator to which is connected a control unit to be tested as the receiving device S1. The messages to be forwarded are received by the HIL system from a first sending device S2, which is either also provided by a control unit or by a replay system which plays recorded messages (for example, of a test drive in a car) to the HIL system. Here, the control unit S1 to be tested also receives messages from another sending device S3, for example another control unit.

Figure 2:
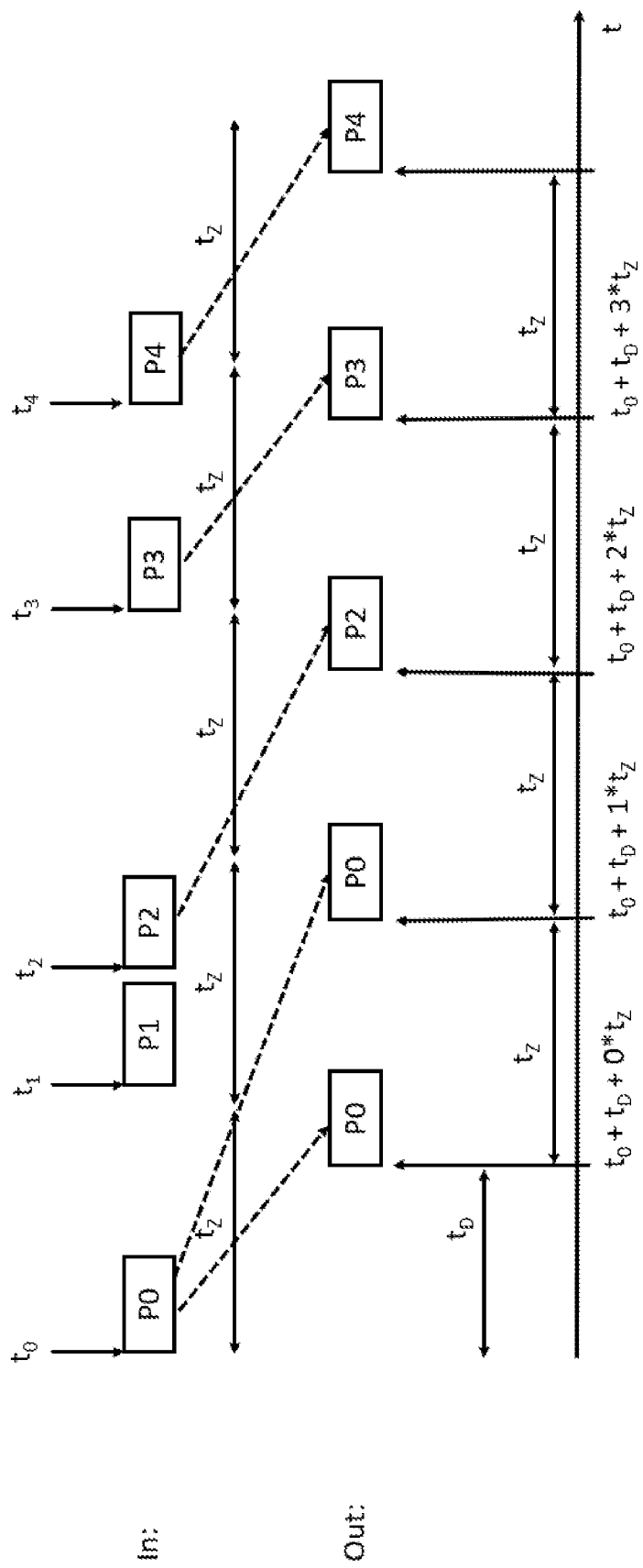
FIG. 2 is a schematic sketch of the method according to the invention.

FIG. 2 illustrates the progress of an exemplary embodiment of the inventive method over time. The upper part of the figure shows the receipt In of messages P0, P1, P2, P3, P4 at the HIL system. The messages arrive at times $t_0$, $t_1$, $t_2$, $t_3$, $t_4$, respectively, and are provided with respective time stamps by the system. The length of cycle time tz is indicated below each of these messages P0, P1, P2, P3, P4. It is apparent that the messages P0, P1, P2, P3, P4 are not received cyclically.

The lower part of FIG. 2 shows the output Out of messages P0, P1, P2, P3, P4. Messages are regularly sent to the control unit to be tested at intervals of cycle time tz.

System time t starts for the entire FIG. 2 at time $t_0$ with the arrival of message P0. A delay time $t_D$ is provided, for the length of which the messages are to remain in the buffer memory before they are forwarded. Here, the cycle is to start at time to $+t_D$. It is assumed that initially, only the message P0 with the time stamp $t_0$ is in the buffer memory at this time. The checking of the difference between the current system time $t=t_0+t_D+0*tz$ and the time stamp $t_0$ of message P0 shows that the difference is equal to the delay time $t_D$ and that message P0 can therefore be sent (indicated by a dashed arrow). Then, the next message is not to be sent until time $t=t_0+t_D+1*tz$. For message P1, since message P1 arrived at the system HIL after time $t_0+tz$, the difference between the current system time and the time of receipt t1 at time $t=t_0+t_D+1*tz$ is less than the delay time $t_D$, and thus, the necessary prerequisite for sending is not fulfilled. For this reason, message P0 is sent a second time.

At the next sending time $t=t_0+t_D+2*tz$, three messages P0, P1, P2 are present in the buffer memory. First, consideration is given to the message P0 that has been in the memory for the longest time, because it fulfills the criterion that the difference is greater than or equal to delay time $t_D$. When searching for a more recent message, the message P1 is checked, which now also fulfills this criterion. However, since message P2 is also already present in the buffer memory, and because time of receipt $t_2$ is less than $t_0+2*tz$, message P2 also fulfills the criterion and is sent because it is more recent than message P1. Messages P0 and P1 are discarded from the buffer memory. In the next cycle, message P3 is sent, since it is received at time $t_3=t_0+3*tz$. In the last cycle shown, the criterion is fulfilled by message P4 as the latest message.

FIG. 2 illustrates how, by using a method according to the invention, in each case only the latest message of a sequence of irregularly arriving messages is sent at regular intervals to a control unit to be tested, and in such a way that a specified delay time is taken into account.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for delayed cyclic forwarding of messages by a system, the method comprising:
   receiving, by an input side of the system, the messages to be forwarded; and
   sending, by an output side of the system, the messages to be forwarded to a receiving device;
   wherein the system has a system time;
   wherein the messages to be forwarded have receive time stamps;
   wherein the messages to be forwarded that are received at the input side are stored in a buffer memory;
   wherein a delay time is specified for the sending of the messages to be forwarded;
   wherein a cycle time is specified for the sending of the messages to be forwarded;
   wherein messages are sent by the system at intervals of the specified cycle time from the buffer memory via the output side of the system to the receiving device;
   wherein for purposes of cyclic forwarding of the messages, the receive time stamp of the message that has been in the buffer memory for the longest time is checked first;
   wherein a check is performed to determine whether the difference between the current system time and the receive time of a message under consideration is greater than or equal to the delay time; and
   wherein:
      in the event that the difference is greater than or equal to the delay time, the message that has been in the buffer memory for the next longest time being checked in the same manner, and the checking of the messages is continued until a difference smaller than the specified delay time is found for a message, or
      in the event that the difference is smaller than the specified delay time, the last checked message for which the difference was greater than or equal to the specified delay time is designated for forwarding, and all previously checked messages are discarded.

2. The method according to claim 1, wherein in the event that in a cycle, a difference smaller than the specified delay time is found for the first message checked, a default message is sent or a message sent in the last cycle is sent again.

3. The method according to claim 1, wherein the system is a hardware-in-the-loop system, and wherein the receiving device is a control unit.

4. The method according to claim 1, wherein the system receives the messages to be forwarded from a first sending device.

5. The method according to claim 1, wherein the forwarding of messages is switched from cyclic forwarding to event-based forwarding or vice versa based on being specified by a user.

6. The method according to claim 1, wherein the cycle time is changed during runtime based on being specified by the user.

7. The method according to claim 1, wherein the messages are written into the buffer memory according to a predetermined temporal order.

8. The method according to claim 1, wherein the receive time stamp is assigned to the messages upon receipt at the input side and is given by the system time at the time of receipt.

9. The method according to claim 1, wherein the delay time is capable of being set in a message-specific manner.

10. A system for delayed cyclic forwarding of messages, the system comprising:
   an input side with terminals for receiving the messages to be forwarded;

an output side with terminals for sending the messages to be forwarded to a receiving device; and a buffer memory for storing the messages to be forwarded that are received at the input side;

wherein the system has a system time;

wherein the messages to be forwarded have receive time stamps;

wherein a delay time is specifiable for the sending of the messages to be forwarded;

wherein a cycle time is specifiable for the sending of the messages to be forwarded;

wherein the output side of the system is configured to send messages at intervals of the specified cycle time from the buffer memory to the receiving device;

wherein, for purposes of cyclic forwarding of the messages, the system is configured to check the receive time stamp of the message that has been in the buffer memory for the longest time;

wherein the system is further configured to check whether the difference between the current system time and the receive time stamp of a message under consideration is greater than or equal to the delay time;

wherein:
  in the event that the difference is greater than or equal to the delay time, the system is configured to check the message that has been in the buffer memory for the next longest time in the same manner and to continue until a difference smaller than the specified delay time is found for a message, and
  in the event that the difference is smaller than the specified delay time, the system is configured to designate for forwarding the last checked message for which the difference was greater than or equal to the specified delay time and to discard all previously checked messages.

* * * * *